(12) United States Patent
McDougle (10) Patent No.: US 6,962,019 B1
(45) Date of Patent: Nov. 8, 2005

(54) ENHANCED FILTRATION AND WATER CONDITIONING SYSTEM FOR A BAIT TANK

(76) Inventor: Frank O. McDougle, 19411 E. 91st St. South, Broken Arrow, OK (US) 74014

( * ) Notice: Subject to any disclaimer, the term of this patent is extended or adjusted under 35 U.S.C. 154(b) by 0 days.

(21) Appl. No.: 10/650,158

(22) Filed: Aug. 28, 2003

Related U.S. Application Data (63) Continuation-in-part of application No. 10/293,117, filed on Nov. 13, 2002, now abandoned.

(51) Int. Cl.⁷ .............................................. A01K 97/00
(52) U.S. Cl. ........................... 43/57; 119/226; 210/189
(58) Field of Search ...................... 43/56, 57; 119/226, 119/228, 229; 210/169, 416.2

(56) References Cited

U.S. PATENT DOCUMENTS

| | | | | |
|---|---|---|---|---|
| 546,883 A | * | 9/1895 | Gunther | 119/259 |
| 2,137,397 A | * | 11/1938 | Haideman | 43/56 |
| 2,594,474 A | | 4/1952 | McGrath | 62/89.5 |
| 2,866,294 A | * | 12/1958 | Rauglas | 43/56 |
| 2,974,437 A | * | 3/1961 | Stadler | 43/55 |
| 3,279,430 A | * | 10/1966 | Mugridge | 119/259 |
| 3,635,344 A | * | 1/1972 | Lovitz | 210/169 |
| 3,890,486 A | * | 6/1975 | Fitzgerald | 219/523 |
| 3,971,338 A | | 7/1976 | Alexson | 119/5 |
| 4,151,810 A | | 5/1979 | Wiggins | 119/5 |
| 4,162,681 A | * | 7/1979 | Patterson | 119/203 |
| 4,182,267 A | | 1/1980 | Kominami et al. | 119/3 |
| 4,748,765 A | | 6/1988 | Martin | 43/55 |
| 4,867,102 A | | 9/1989 | Turano | 119/2 |
| 4,970,982 A | | 11/1990 | Martin | 114/255 |
| 4,975,562 A | * | 12/1990 | Friedman | 219/523 |
| 5,010,681 A | | 4/1991 | Cox, Jr. | 43/57 |
| 5,054,424 A | * | 10/1991 | Sy | 119/260 |
| 5,088,229 A | * | 2/1992 | Andrews | 43/57 |

(Continued)

FOREIGN PATENT DOCUMENTS

GB          2198051 A   *   6/1988       A01K/63/04

*Primary Examiner*—Peter M. Poon
*Assistant Examiner*—David Parsley (57) ABSTRACT

An enhanced filtration and water conditioning system for a novel bait tank suitable for use in recreational boats, dockside and land based personal and commercial applications wherein water from the tank may be climactically controlled, filtered, purged of sediment, displaced scales and other fish waste and returned to the live well tank. Separate first and second water compartments within the tank function in concert with a second interior wall and a second interior bottom, a dual compartment filtration unit removably accommodated within the interior portion of the second compartment, and filtration unit inflow and outflow water conduits with each of the conduits communicably attaching the filtration unit to the first and said second interior water compartments. An independent circulatory means allows for water to be additionally withdrawn from the tank and introduced to a refrigerant based heat exchanger means, regulated in a manner to sustain a water temperature necessary to sustain the life of fish placed within the tank and then re-introduced into the tank.

3 Claims, 10 Drawing Sheets

U.S. PATENT DOCUMENTS

| | | | | |
|---|---|---|---|---|
| 5,171,438 A | * | 12/1992 | Korcz | 210/169 |
| 5,172,511 A | | 12/1992 | Smith et al. | 43/56 |
| 5,172,650 A | * | 12/1992 | Hsu et al. | 119/259 |
| 5,231,789 A | * | 8/1993 | Radmanovich | 43/57 |
| 5,299,424 A | | 4/1994 | Woodson et al. | 62/3.7 |
| 5,305,544 A | * | 4/1994 | Testa, Jr. | 43/54.1 |
| 5,306,421 A | * | 4/1994 | Weinstein | 210/151 |
| 5,444,227 A | * | 8/1995 | Chestnut | 219/506 |
| 5,518,611 A | * | 5/1996 | Bresolin | 210/169 |
| 5,732,657 A | * | 3/1998 | Idbeis | 119/257 |
| 5,822,916 A | | 10/1998 | Power | 43/57 |
| 5,861,093 A | * | 1/1999 | Bennett | 210/168 |
| 5,866,018 A | * | 2/1999 | Hyde et al. | 210/787 |
| 6,044,901 A | | 4/2000 | Basala | 165/122 |
| 6,106,709 A | * | 8/2000 | Bresolin | 210/169 |
| 6,234,113 B1 | * | 5/2001 | Dor | 119/259 |
| D449,368 S | * | 10/2001 | Gray | D22/136 |
| 6,499,431 B1 | * | 12/2002 | Lin et al. | 119/226 |
| 6,533,928 B1 | * | 3/2003 | Terato | 210/169 |
| 6,659,043 B1 | * | 12/2003 | Huska | 119/226 |
| 2003/0033746 A1 | | 2/2003 | Johnson et al. | 43/55 |

* cited by examiner

ENHANCED FILTRATION AND WATER CONDITIONING SYSTEM FOR A BAIT TANK

CROSS-REFERENCE TO PENDING APPLICATIONS

The present application is a continuation-in-part application of U.S. patent application Ser. No. 10/293,117, filed Nov. 13, 2002, now abandoned, entitled "FISH OR FISH BAIT LIFE PRESERVATION APPARATUS AND METHOD", said parent application is incorporated herein by reference in its entirety.

TECHNICAL FIELD OF THE INVENTION

The present invention relates generally to an apparatus and method for the temporary captive storage of live gamefish and other similar aquatic animals. More particularly, the present invention relates to an improved bait tank apparatus and method which may be adapted for use in conjunction with a refrigerant based cooling means intended to enhance captive fish life span and quality.

BACKGROUND OF THE INVENTION

Over recent years, recreational and sport fishing has grown considerably in popularity as well as sophistication with the advent of more scientifically-designed fishing equipment and techniques. As part of this trend, various technical and design improvements in recreational fishing boats have evolved, one such improvement being the provision of an inboard water reservoir or tank, commonly referred to as a "live well," for containing a quantity of water in which to store captured fish or bait in hopes of maintaining them alive for a reasonable period of time in captivity.

Conventional live wells provided in modern recreational fishing boats typically provide a battery-operated electric water pump for selectively filling the tank with water drawn from a lake (or ocean) and an overflow discharge line to maintain a maximum level of water in the tank and prevent overfilling thereof. More sophisticated live wells also provide a pump-operated aeration system for withdrawing water contained in the tank and spraying it in return into the tank to replenish any oxygen from the water consumed by fish or bait stored therein. An electric timing device is sometimes provided to periodically actuate and de-actuate the aeration system. In addition, it is normally necessary in practice to periodically operate the fill pump for the tank to discharge through the overflow line fish scales, slime secretions and waste discharges which captured fish typically expel in their normally excited state after being placed in the live well. A timing device may therefore also be provided in conjunction with the live well fill pump to automatically perform this overflow discharge periodically.

Despite the above-described provisions in the most sophisticated conventional live wells for maintaining a relatively clean body of contained water in the live well and for continuously aerating the water, experience has shown that even the most sophisticated live wells are incapable of reliably maintaining captured fish alive for more than one to three hours. The severity of this problem can be affected by numerous factors, including the particular species of fish involved, the condition and excited nature of the fish, the condition of the water utilized in the live well including for instance its oxygen content and temperature, etc., all of which make it difficult to evaluate and determine the reason or reasons for this problem.

Fish located in the live well are typically from water cooler in temperature than that experienced in a live well. Consequently, a major deficiency with conventional live wells is that once the live well is filled with fluid, the temperature of the fluid will eventually reach or exceed ambient air temperature and/or the temperature of water from which the fish has been removed. The present invention addresses this deficiency and advances the art by reducing the temperature of the fluid in the live well via refrigerant based cooling means to maintain a temperature closer to the normal habitat of the fish and reduce the likelihood of shocking the fish.

It is theorized that one of the principal causes of problems in maintaining captured fish alive is the excited nature of the fish when placed in a generally enclosed live well or similar tank. As mentioned above, in this excited condition, fish tend to lose some portion of their scales and their natural slime secretions as well as to discharge bodily wastes and even to vomit the contents of their digestive tracts. All of this foreign matter in the water in a live well poses a danger to the fish in that the foreign matter may become lodged in the fish's gills during normal breathing. Moreover, the excited nature of the fish significantly increases its metabolism causing it to utilize oxygen from the water at a significantly increased rate. Finally, it is known that fish are relatively sensitive to the temperature of the ambient body of water and, therefore, any difference in the temperature of the water in the live well from that of the surrounding ambient body of water, particularly when the live well water is elevated, may exacerbate the excited condition of the fish. As distinguished from the instant invention, conventional live wells make essentially no provision for compensating for any of these factors, other than the afore described provision of water overflow and refilling of the live well and an aeration system for replenishing oxygen to the water contained in the live well.

Occasionally ice is used as a cooling agent but commercially made ice generally contains chlorine, fluorine and other chemicals which are fatal to bait and fish and further most waters supplied for human use contain chemicals, such as chlorine, which cause the death of aquatic life. More often than not, no effort is made to precisely control temperature as well as the oxygen content of the water containing bait and fish and both of these elements require precise control to preserve bait and fish in an alive condition. As is known, the temperature of water is inversely proportional to the amount of oxygen that the water contains and this is commonly overlooked by a fisherman in carrying his bait and fish about. It is a common practice for fisherman to fill his bait and/or fish bucket from a water source such as a lake at his fishing site and in summer the surface water is relatively hot and oxygen depleted which is a thermal shock to bait and fish which are accustomed to deeper cool water having an adequate oxygen content.

In substantial contrast, the present invention provides a novel live well apparatus and method designed to operate according to concepts of cleaning, oxygenating and cooling the water contained in the live well tank to a temperature approximately the natural aquatic habitat of captured gamefish to be stored in the tank in an enhanced manner unparalleled in the contemporary art. As used throughout the present application, the terms "bait tank", "live well", "live well tank" and "tank" are used interchangeably and synonymously and are intended to refer to the water restraining portions of the tank herein disclosed. Said "tank" encompassing both first and second water compartments as indicated throughout the present application. In so doing the captive life of the fish is prolonged by effectively calming any excited tendency of the fish to reduce or even eliminate the above-described waste discharges and other foreign matter in the live well which in the instance of the present application is comprised in coordinated communication of a refrigerant compressor, condenser, flow control valve, evaporator, water conditioning component and thermostatic controls.

SUMMARY OF THE INVENTION

In one embodiment of the present invention, an enhanced tank, filtration and water conditioning system for a bait tank is disclosed comprising a bait tank having a top, a bottom and an essentially oval shaped exterior wall connecting the top and bottom of the tank, first and second interior water compartments separated from one another and the wall, top and bottom of the portions of the tank via rip a second interior wall and a second interior bottom, a compartmentalized filtration unit removably accommodated within the interior portion of the second compartment, filtration unit inflow and outflow water conduits with each of said conduits communicably attaching said filtration unit to said first and said second interior compartments; a pump means for circulating water from said first compartment into and through said second compartment and returning said circulating water to said first compartment and alternatively/optionally the tank as summarized further connected to a water conditioning means. Connected to a water conditioning means purposed to withdraw water from the tank regulated in a manner to sustain a water temperature necessary to sustain life of fish placed within the tank and re-introduce said conditioned water back to the tank.

Consequently it is an object of the instant invention to provide a temperature management system for a live well which automatically reduces temperature of the fluid in the live well to sustain fish placed therein for extended periods.

Another object of the instant invention is to allow a user to operate the apparatus effectively with no knowledge of appropriate liquid temperature required to sustain the fish.

Yet another object is to rely upon automatic thermostatic control to effectuate water circulation via recirculating pump, through a water conditioning unit containing refrigerant to reach and maintain a desired water temperature.

A further object of the instant invention is to cool the water in a live well so to cause the temperature of the water to approximate to the water temperature where fish normally reside and thus increase the likelihood that fish placed in the live well will survive for extended periods.

Yet another object of the instant invention is to provide a heat exchanger utilizing a refrigerant to cool live well water to a temperature at, or below that from which a fish has ben immediately withdrawn.

A further object of the instant invention is to provide a live well tank comprised of a plurality of interior water compartments which facilitates enhanced filtering and capture of fish scales and other fish waste.

Another object of the instant invention is to provide an enhanced filtering system which not only captures fish scales and other fish waste but further allows more introduction of supplemental oxygen or air means to a water flow destined returned to interior water compartment containing fish at a level below the surface of water contained therein.

Yet another object of the instant invention is to teach, disclose and claim a bait tank having a top, bottom, essentially oval shaped exterior wall connecting the top and bottom of the tank as well as an essentially oval shaped interior wall distanced sufficiently from the oval shaped exterior wall to allow a displacement therebetween of an insulating material.

A further object of the instant invention is to allow the introduction of an insulation material to the tank described herein which is fiberglass.

Another object of the instant invention is to allow the introduction of an insulation material to the tank described herein which is a gaseous compound.

An additional object of the instant invention is to allow the introduction of an insulation material to the tank described herein which is an expandable foam compound.

Another object of the instant invention is to teach a bait tank which further comprises one or more tubular rod holder affixed to the tank's exterior wall.

Yet another object of the instant invention is to teach a bait tank wherein a tank interior bottom (referred to synonymously and interchangeably herein as second interior bottom) is spaced sufficiently from an exterior tank bottom to allow insertion therebetween of an insulating material and a return channel for water to be directed to a filtration unit purposed to remove fish scales and other fish waste.

Another object of the instant invention is to teach a system by which two entirely separate circulatory systems may be incorporated to first allow for enhanced filtration of water within the bait tank and secondly an independent system to allow for water conditioning wherein said water conditioning is purposed to provide consistency of water temperature by a refrigerant based cooling means to approximate the temperature of water from which fish have been removed and to enhance their life span.

Yet a further object of the instant invention is to teach an enhanced filtration and water conditioning system for a bait tank wherein the bait tank of the system may be used independently of the water conditioning facility herein disclosed.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. For example, though the tank of the instant invention has been tested extensively utilizing two separate and distinct interior water compartment, it will become readily apparent to one skilled in the art that the invention may be practiced substantially similar manner producing a substantially similar result utilizing a single interior water compartment as opposed to the two interior compartments. Consequently, the invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the design engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Additional objects and advantages of the invention are set forth, in part, in the description which follows and, in part, will be apparent to one of ordinary skill in the art from the description and/or from the practice of the invention. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

DESCRIPTION OF THE DRAWINGS

Prior art Figure A is a parent application illustration of a live well of the contemporary art when viewed from above.

FIGS. 9 through 10C are detailed views illustrating various views of filtering element components used in association with the enlarged view of the filtration unit of FIG. 8A.

DESCRIPTION OF THE PREFERRED EMBODIMENT

Figure 1:
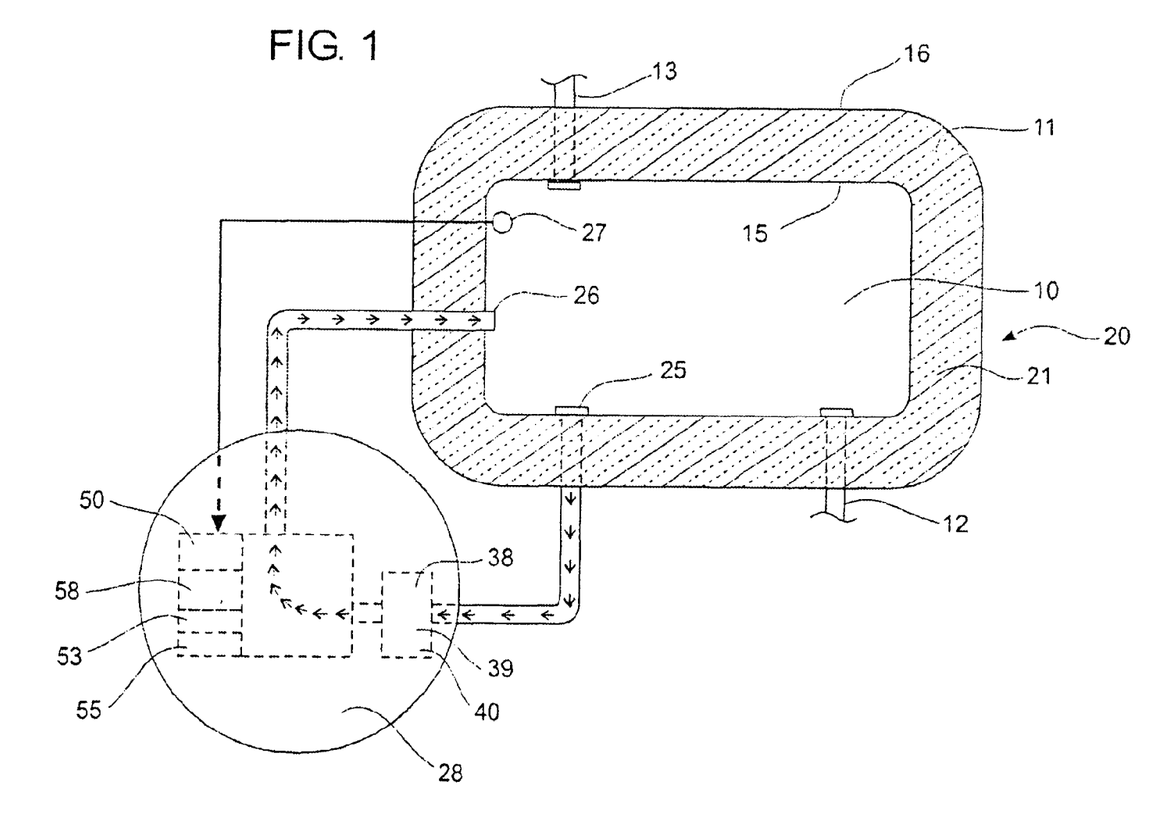
FIG. 1 is a parent application illustration of a live well embodiment of the instant invention when viewed from above.

Prior art Figure A is an illustration of a live well of the contemporary art when viewed from above. As used herein, the term "first compartment" and "live well" are used interchangeably and synonymously as are the terms "second compartment" and "water conditioning compartment". Turning to prior art Figure A, the live well of the contemporary art is generally indicated by number 10 wherein such live wells are typically constructed of molded polyurethane material and have encased within their inner wall 15 and outer wall 16 insulation 11. Further, live wells of the contemporary art 10 typically have an overflow outlet 13 which provides for an exiting of fluid from the tank at a pre-determined level. Said overflow outlet 13 is typically connected to an exiting means such as a flexible tubular structure, such as a rubber hose which allows for the traversing of fluid entering the hose from the live well 10 through the hose and exiting out an opposite end of the hose into a body of water upon which the boat containing said live well rests. Element 12 with respect to prior art Figure A illustrates a filling mechanism which is typically located within the interior portion of said live well 10 and is attached to an upwardly directed pipe-like structure when said inlet 12 rests upon the bottom of said live well 10. FIG. 1 is an illustration of a live well embodiment of the instant invention when viewed from above. Turning now to FIG. 1.

Figure 2:
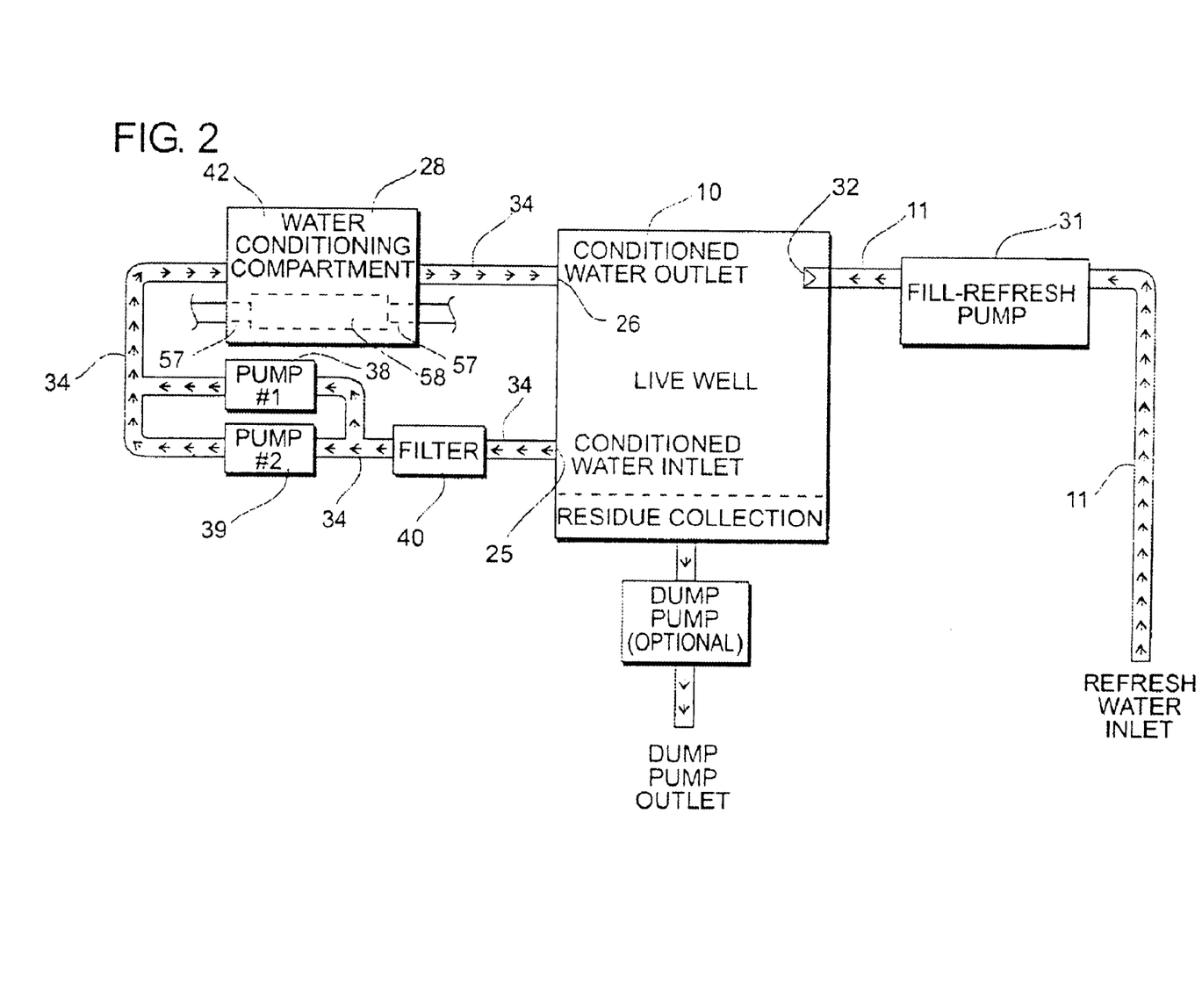
FIG. 2 is a parent application illustration and illustrates functional components of the instant invention and circulatory water flow path associated therewith.

In FIG. 1 distinctions between the live well of the contemporary art as presented in prior art Figure A can be readily appreciated and observed. In the illustrative embodiment of the instant invention depicted in FIG. 1, live well of the instant invention is generally referred to as 20. The live well 20 further comprises insulating material 21 and an inlet filling means 32. Said filling means to be discussed in further detail in association with FIG. 2. The live well of the instant invention as illustrated in FIG. 1 also discloses a water conditioning inlet 25 and conditioned water outlet 26. A temperature sensing means 27 is also disclosed in association with FIG. 1 and will be further discussed in association with FIGS. 2 through 6. FIG. 2 illustrates functional components of the instant invention and circulatory water flow path associated therewith. Turning now to FIG. 2.

In FIG. 2 water is first introduced to the interior portion of the live well tank 10 via water inlet 32. Said inlet 32 is typically structured as a piping means utilized in conjunction with one or more pumping motors 31 to introduce water via conduit 11 to the internal portion of live well 10 until a desired depth has been achieved. The inlet 32 provides an attachment means by which it may be removed or otherwise altered to allow quick and expedient drainage of any fluid contained within the interior portion of live well 10. Also shown in FIG. 2 is a refresh pumping means 31 wherein water may enter the internal portion of live well 10 via water flow conduit 11 having first served as a conduit vehicle through which water is pumped from a water body through pump 31 continuing through a water inlet 32 which traverses from the internal portion of live well 10 to said pump's external surface where it is connected to said water flow conduit 11. Once water has been introduced into the internal portion of live well 10 and a desired depth realized, the water is circulated through water flow conduit 34 via electric pumps 38 and/or 39. Said electric pumps (38, 39) can work independently or in conjunction with one another depending upon a flow rate necessary to precipitate cooling of water first introduced into internal area of live well 10. Water housed within the internal portion of live well 10 exits said live well through conditioned water inlet 25 and water flow conduit 34 traversing an optional filter 40 and then selectively passes through either or both pumps 38 and 39. Upon passing through said pumps, water continues on a circulatory path entering water conditioning compartment 28 which is designed to remove desired heat from water traversing said water flow conduit 34 via refrigerant means. Further detail with respect to the disclosure of the invention's refrigerant based heat exchanger means will be provided in association with discussion of FIGS. 3 through 5.

Figure 3:
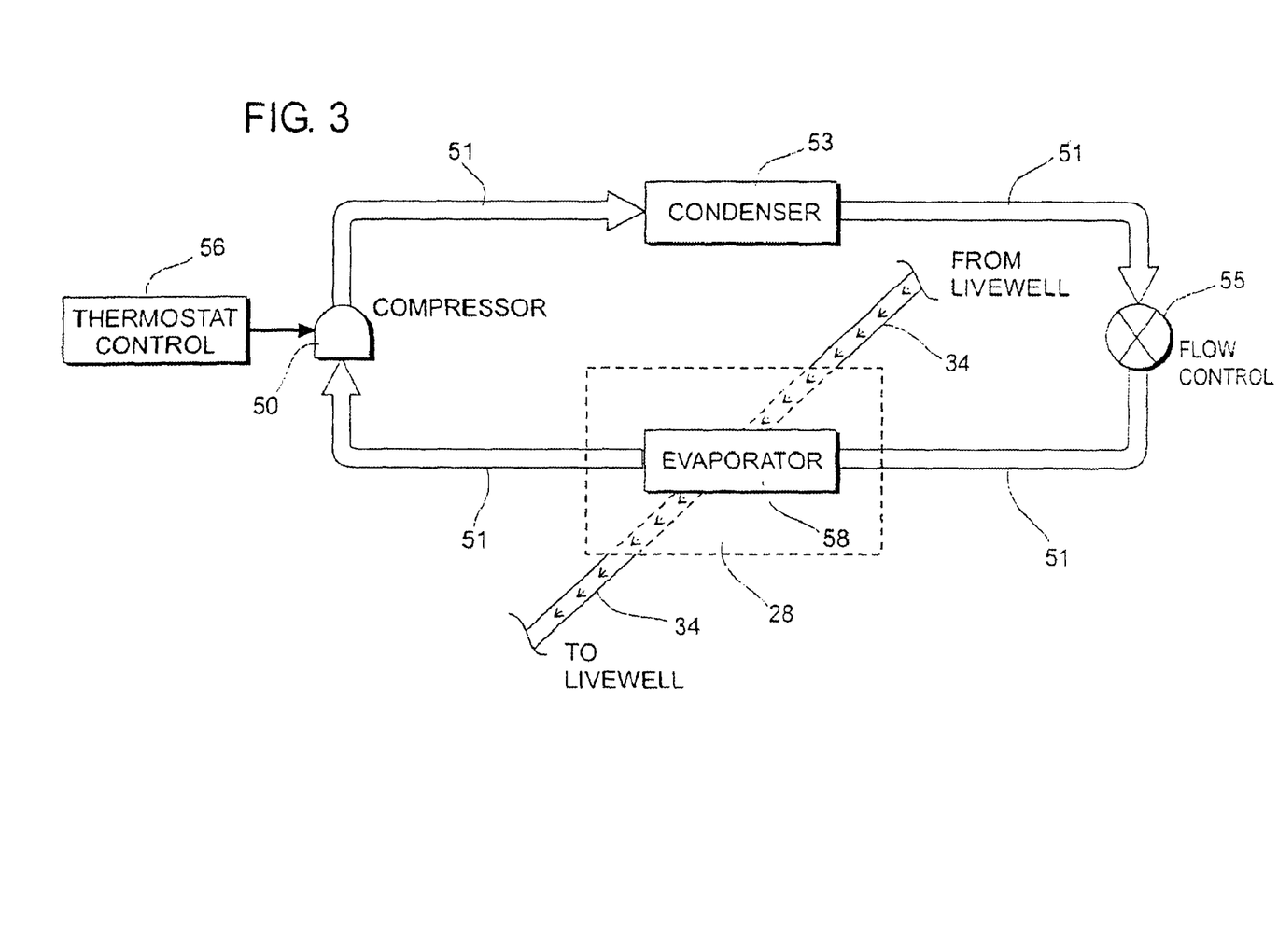
FIG. 3 is a parent application block diagram of water conditioning elements of the instant invention.

Continuing with FIG. 2, it can be seen that functional components of the instant invention comprise of a pair of removably transportable compartments having internal portions therein where the first of said compartments is a live well 10 containing water that is a natural habitat for bait or fish and a temperature probe (27, FIG. 1) determining and controlling the temperature of said water. The second of said compartments is a water conditioning compartment 28 which has an internal portion 42 further comprised of a tubular conductor 57 in communication with an evaporator 58, compressor and condenser forming a heat exchanger, said heat exchanger (not illustrated in FIG. 2) but discussed in detail in association with FIG. 3. Refrigerant traverses the internal portion of the tubular conductor 57 (herein synonymously referred to without limitation as tubular water conditioning device) and via circulating water pumps 38 and/or 39 circulates water toward the internal portion of the live well 10. Subsequent and concurrent cooling of water traversing conduit 34 occurs via communication with said heat exchanger means housed adjacent to water flow conduit 34 within second compartment 42. FIG. 3 provides additional detail with respect to refrigeration means by which water is cooled utilizing the teachings of the instant invention. Turning now to FIG. 3.

As seen in FIG. 3, water first enters the water conditioning compartment 28 via water flow conduit 34. Once introduced to the internal portion of water conditioning compartment 28, water contained in the internal portion of water flow conduit 34 passes in close, though separate proximity, to a refrigerant used in association with evaporator 58. It is known and appreciated by those skilled in the art, close proximity passage is typically facilitated via the traversing of a tubular structure surrounding flexible piping or other similarly intended structures which are capable of transporting compressed refrigerant. Without limitation, the instant invention through extensive testing has been found to render effective performance when utilizing hydrochlorofluorocarbon, hydrofluorocarbon, chlorofluorocarbon or Tetrafluroroethane (R134a) based refrigerants. The flow of refrigerant through refrigeration means is well known to those skilled in the art but is generally depicted as a refrigerant contained within structure 51, with said refrigerant's flow thermostatically controlled via a sensing mechanism 27 (FIG. 1) used in conjunction with a thermostatic control 56, thus precipitating the running of compressor 50 propelling refrigerant contained within conduit 51 through compressor 53, control valve 55 and continuing therefrom to evaporator 58. The water conditioning compartment 28 is comprised of a tubular compound coil design to permit water flow through the inner tube element (34, FIG. 2) in very close proximity (usually less than .005 inch) to the outer tube element 51 which serves as the heat transferring device of this unit.

Figure 4:
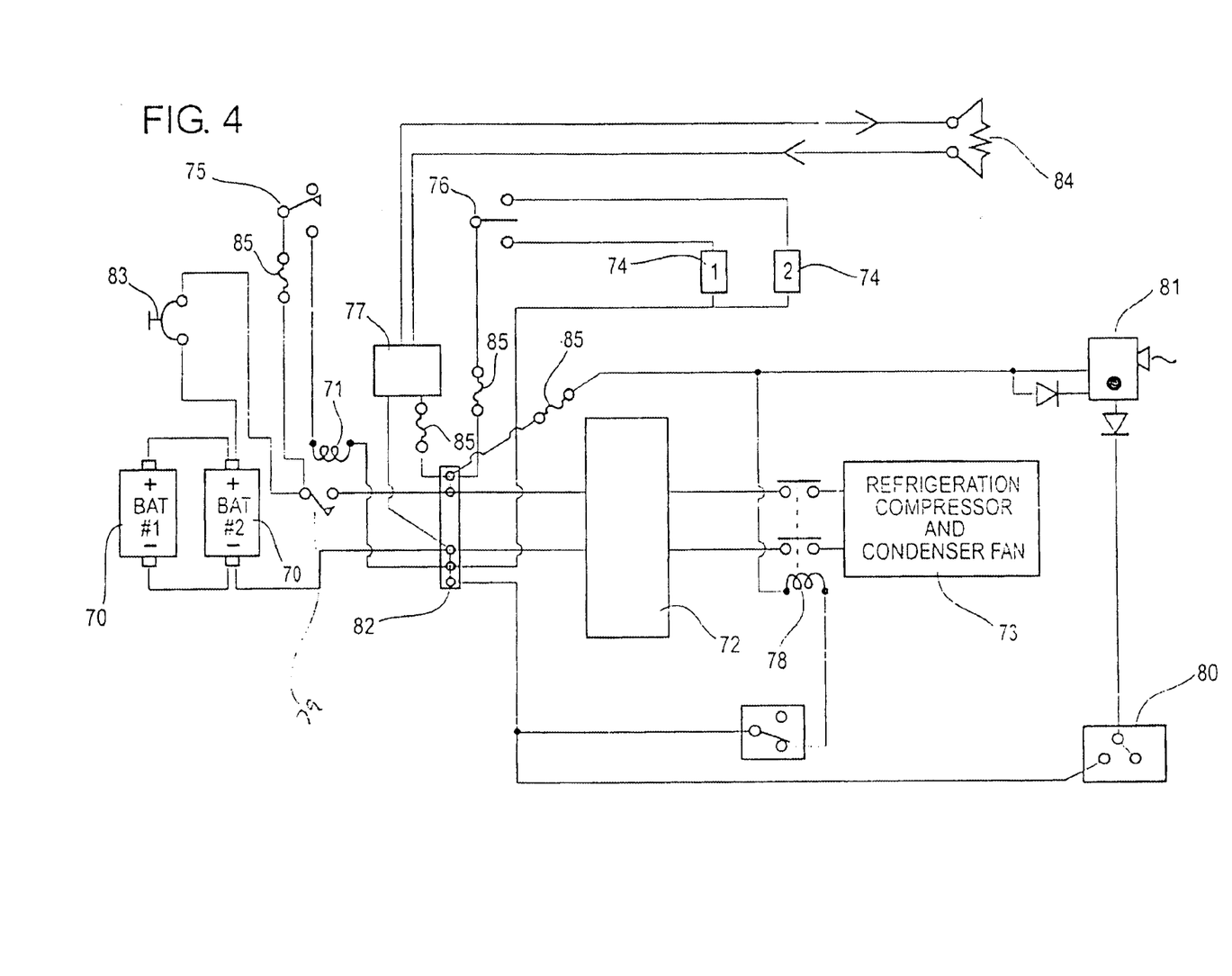
FIG. 4 is a parent application electrical schematic supporting the water flow and water conditioning system of FIGS. 2 and 3.

FIG. 4 illustrates an electrical schematic wherein the teachings of the instant invention are provided in association with a marine vehicle utilizing direct current to circulate water via at least one electrical pump using said direct current. Turning now to FIG. 4.

In FIG. 4 electrical circuitry descriptiveness is provided with detail to disclose electrical components and connections associated therewith to allow practice of the instant invention wherein element 70 relates to one or more marine batteries; 71 a system power relay; 72 a 1600 watt inverter; 73 refrigeration components; 75 system control switch; 76 pump select switch; 77 analog to digital converter and LCD (light emitting diode) display; 78 DC compressor contactor; 79 holding tank thermostat and 80 alert thermostat. Element 81 is an audio alert for 70° F. temperature or low battery indication 82, terminal strip 83 is a 30 amp circuit breaker, 84 is a temperature probe and 85 in-line fuses. Holding tank thermostat 79 will remain closed activating refrigeration components 73 until the holding tank water of the live well reaches a temperature of 60° F. Thermostat then opens deactivating the refrigerating process. The system is designed to cycle in and around the preset desired temperature of 60° F.

Figure 5:
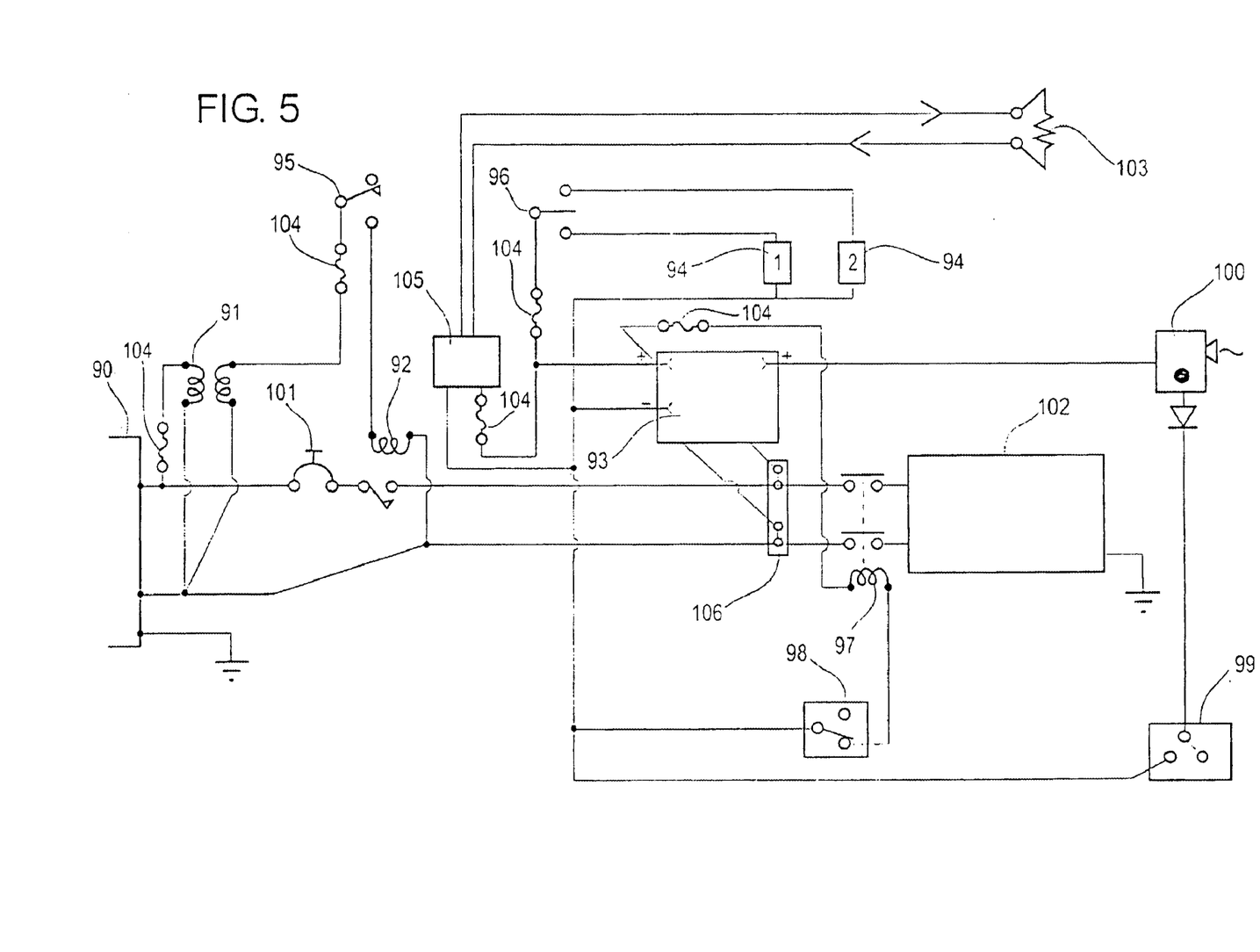
FIG. 5 is a parent application electrical schematic supporting the water flow and water conditioning system of FIGS. 2 and 3 when configured in a boat with auxiliary power unit capability.

FIG. 5 illustrates an electrical schematic for boats wherein alternating current is provided to drive water circulation and cooling associated with practices of the instant invention. Turning now to FIG. 5.

In FIG. 5 it is seen where components and circuitry notation well known to those skilled in the art is provided for the purposes of a full and enabling disclosure. In FIG. 5, element 90 denotes an auxiliary power unit delivering 115 volts alternating current 60 hertz generating 2000 watts. Element 91 is a low voltage 24 AC step down transformer; 92 is an air conditioning power contactor; 93 is a 115 VAC, 60 watt rectifier with output of 12 volts direct current, 10 amps; 94 the circulatory pump or pumps of the invention; 95 system on/off switch; 96 pump select on/off switch; 97 compressor and condenser fan contactor; 98 holding tank thermostat which through extensive experimentation opens at 60° F.; 99 is an alert thermostat which through extensive experimentation closes at approximately 70° F.; 100 audio alert denoting 70° F. temperature; 101 is a 20 amp circuit breaker; 102 is refrigeration components as discussed and disclosed in association with FIG. 3; 103 is temperature probe, 104 an in-line fuses 5 amp, and 105 an analog to digital converter and LED temperature display.

Figure 6:
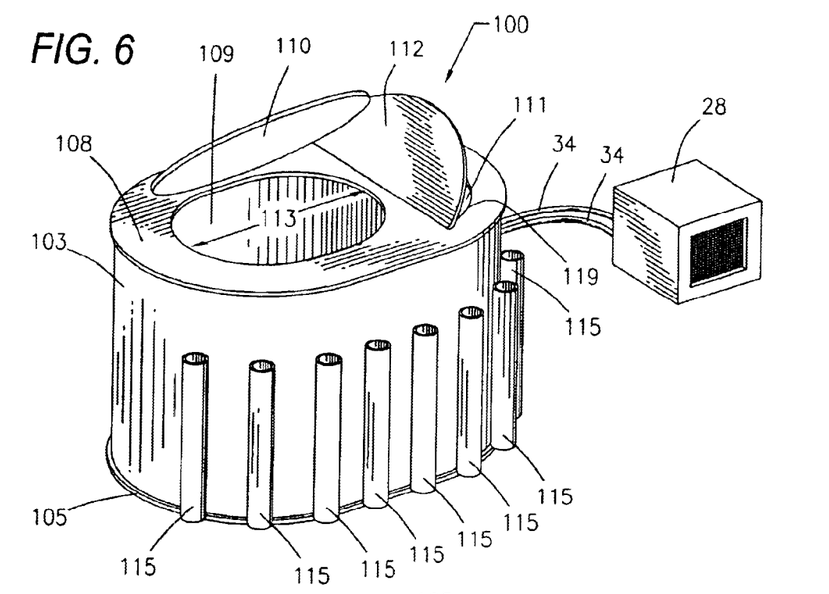
FIG. 6 is an illustration of the tank of the instant invention disclosing externally viewed elements of the invention and connection of the invention's tank to a water conditioning unit.

FIG. 6 is an illustration of the tank of the instant invention disclosing externally viewed elements of the invention and connection of the invention's tank to a water conditioning unit. Turning now to FIG. 6.

In FIG. 6 the bait tank of the instant invention is illustrated as element 100. The bait tank 100 further comprises a top 108, an exterior bottom 105 and an essentially oval shaped exterior wall 103 connecting the top 108 and bottom 105. The bait tank as illustrated in FIG. 6 is further shown accommodating a first interior water compartment 109 and second interior water compartment 111. First and second interior water compartments 109, 111 are communicably connected by at least two water traversable conduits (not shown in FIG. 6). A water conditioning unit 28 may be communicably attached to the tank 100 via inlet and outlet water conditioning conduits 34 which allow for water to be extracted from the internal portion of tank 100 passed through the water conditioning unit 28 and returned to the tank in a conditioned/cooled state. Said water conditioning unit 28 having been fully presented, disclosed and claimed in the parent and co-pending application (10/293,117). Optionally attached to the exterior wall 103 of bait tank 100 are shown one or more fishing rod holders 115 which are generally displaced about the circumference of external wall 103. A first interior water compartment top lid 110 is shown and is pivotally or otherwise attached to the tank top 108 to cover or otherwise seal an appropriately dimensioned aperture 113 providing access to the first internal portion 109 of the tank 100. Also shown in FIG. 6 is a second interior compartment top lid 112 which is also pivotally attached to top 108 and provides access to the second internal/interior water compartment 111 via access aperture 119.

Figure 7:
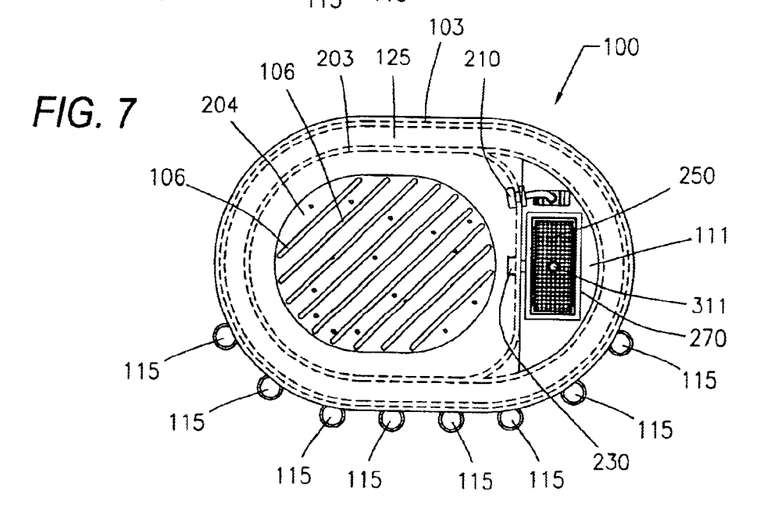
FIG. 7 is a top view illustration of the tank of FIG. 6.

FIG. 7 is a top view illustration of the tank of FIG. 6. Turning now to FIG. 7.

In FIG. 7 an essentially oval shaped interior wall 203 is observed, distanced and positioned sufficiently from the oval shaped exterior wall 103 to allow displacement therebetween of an insulating material 125. Interior wall 203 is connected to the interior portion of top 108 and a tank second interior bottom 204 with said tank interior bottom 204 being distinguishably distinct from bottom 105 and discussed and disclosed in further detail in association with FIGS. 8 and 8A. The tanks filtration unit 270 is shown accommodated within the second interior water compartment 111 with spacing unit inflow conduit 230 and outflow conduit 210.

Figure 8:
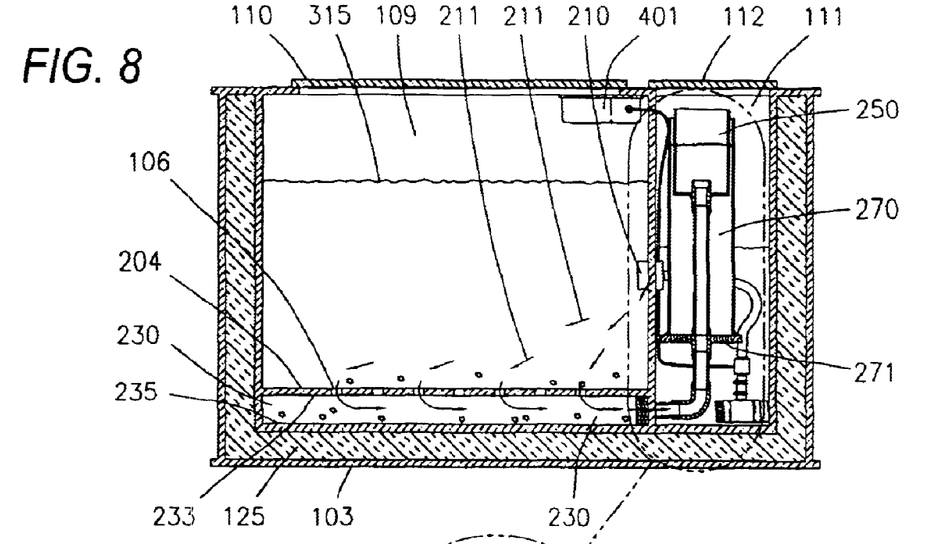
FIG. 8 is a cut-away illustration of the tank of FIGS. 6 and 7.

FIG. 8 is a cross-section view of the tank of FIG. 7 along lines AA. Turning now to FIG. 8.

Figure 8A:
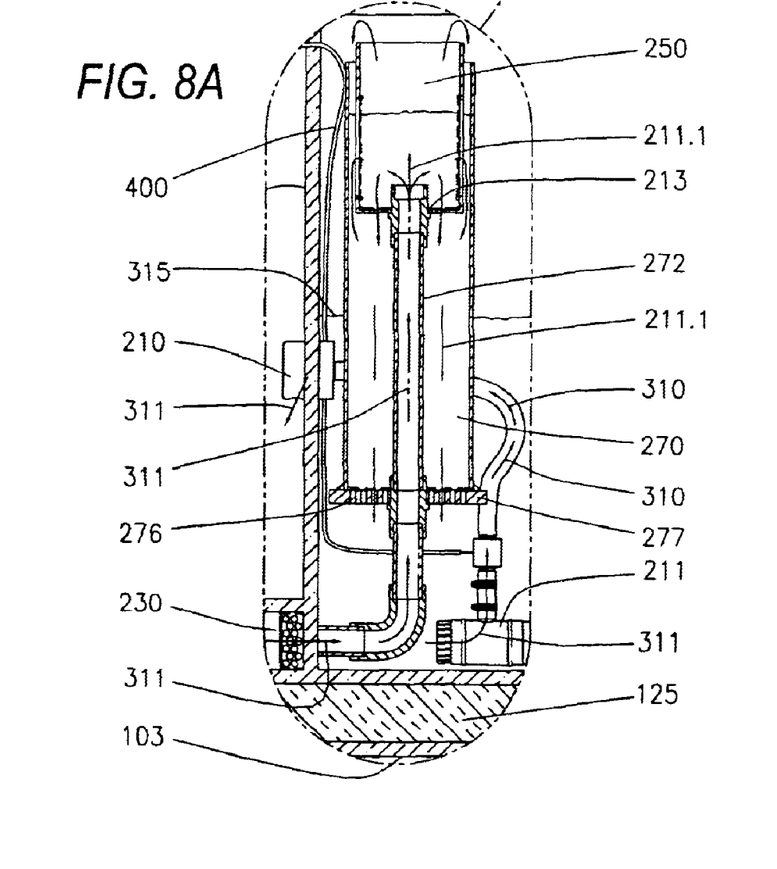
FIG. 8A is an enlarged sectional view of the filtration unit illustrated in FIG. 8.

In FIG. 8 the surface water level inside first water compartment 109 is shown as element 315. The second interior bottom 204 is shown displaced from tank bottom 103 resulting in the presentation of a returning water channel 230 (a.k.a. filtration unit inflow). Also shown in FIG. 8 is an insulating material 125 which substantially surrounds tank 100 on the bottom and opposite sides of the tank in a manner to consistent with intent to maintain of water temperature. The return water channel floor 230 is shown sufficiently distant from openings 106 in the interior bottom 204 to allow for water to be displaced from the first interior water compartment 109 with said water in descending flow through or openings 106 entering into channel 230 and subsequently introduced to the second interior water compartment containing filtration unit 270. Details with respect to water circulation flow and said second filtration unit are further explained in accordance with FIG. 8A. Turning now to FIG. 8A.

FIG. 8A is an enlarged sectional view of the filtration unit illustrated in FIG. 8. In FIG. 8A it is shown where water inflow conduit 230 is utilized to introduce water flow 311 to the filtration unit. The water 311 so introduced proceeds operably through a pipe-like structure 272 emptying from said structure at 271 into a first filtration section 250. Said water flow 311 is illustrated as exiting the pipe-like structure within the first filtering section 250 and then traversing outwardly through openings 251 which will be further discussed in association with FIGS. 10 through 10B and continuing in a descending manner, through a second filtration element 276. First filtration element shown as 213 and is generally positioned on the bottommost surface of the first filtering section 250 and is comprised of a porous or otherwise fluid traversable membrane to allow water to pass through the membrane while retaining fish waste, such as, but not limited to, scales and other non-desired elements. Having traversed said filtering means 270, filtered water is pumped by a pumping means 211 to a water outflow conduit 310 entering into conduit means 210 which reintroduces the water to the first interior compartment of the tank 109 at a level below the surface 315 of existedly contained therein. Further shown in FIG. 8A is an air infusion means 400 comprising of an air conduit 400 connected to an air pump 401 (FIG. 8) which allows a stream of oxygenated air or other gas to enter filter water stream 310 prior to being re-introduced to the first internal water compartment of tank 109.

Figure 9:
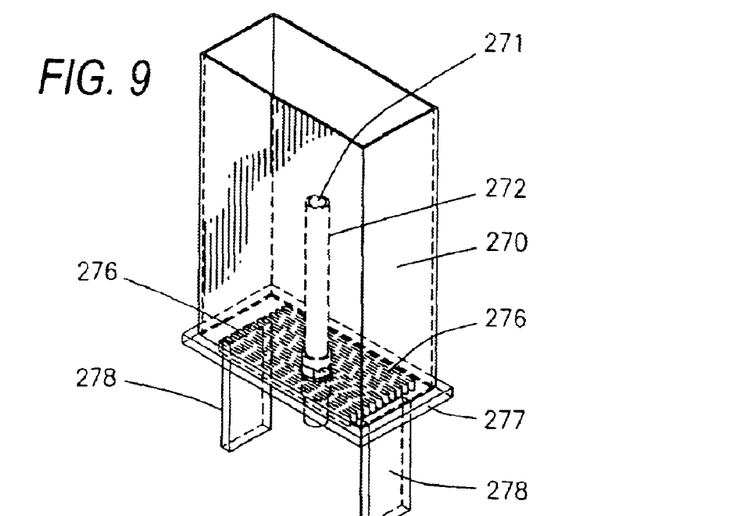
Figure 9A:
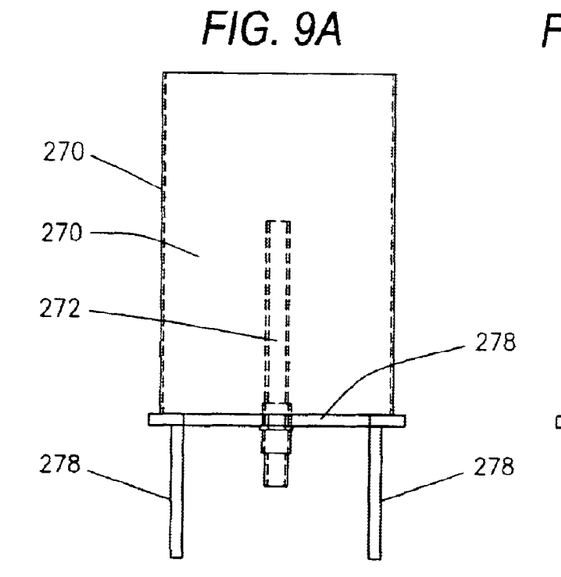
Figure 9B:
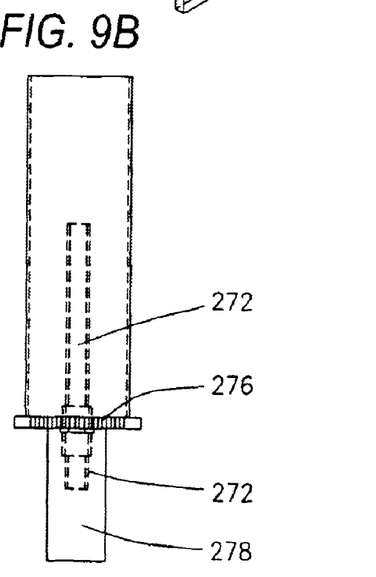
Figure 9C:
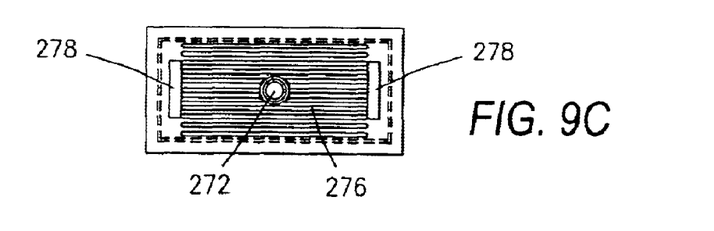
Figure 10:
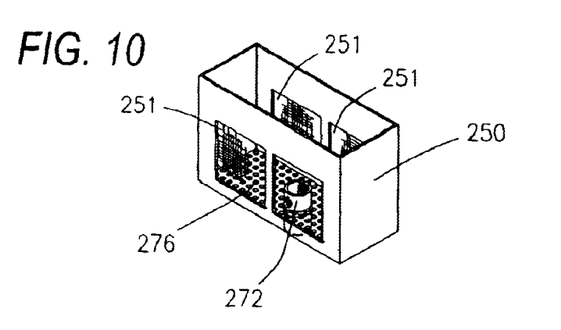
Figures 10A, 10B, 10C:
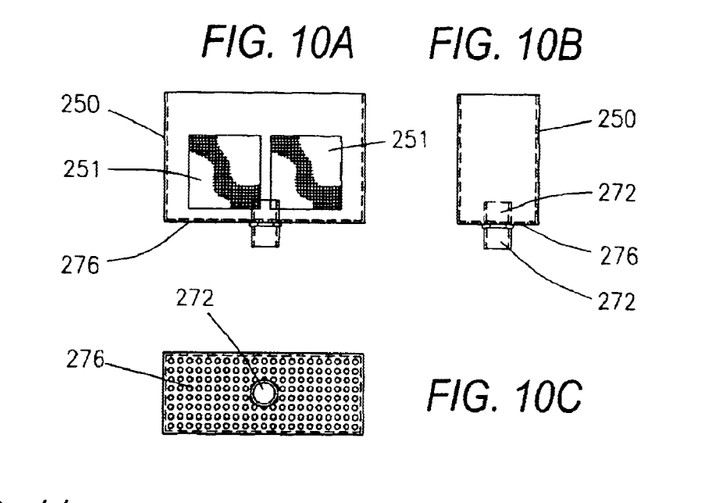
Figure 11:
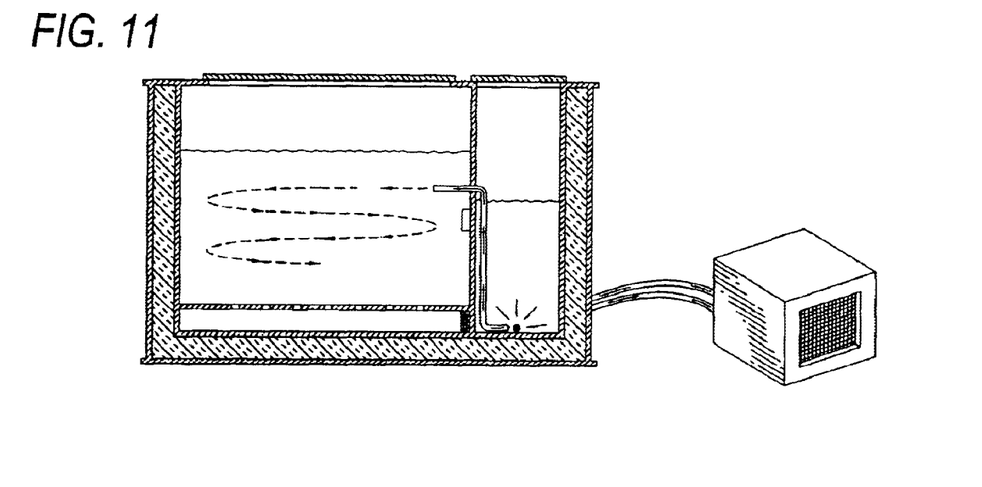
FIG. 11 is an illustration showing the bait tank of the instant invention practiced in combination with the water conditioning unit of the invention.

FIGS. 9 through 10C are detailed views illustrating various views of filtering element components used in association with the enlarged view of the filtration unit of FIG. 8A. Turning now to FIGS. 9 through 10C.

In FIG. 9 the pipe-like structure 272 introduces unfiltered water to the filtering compartment 270 at displacement point 271. A second filtering element is shown as element 276. Leg supports 278 which are insertably positioned within the second water compartment is shown. As further disclosed in FIG. 9, the pipe-like structure 272 serves as a conduit where water is introduced to the filtering element and exits the pipe-like structure 272 via orifice 271. FIGS. 9A through 9C disclose and illustrate the elements, components and structural relationship of said components filtering compartment 270 defined in FIG. 9 and further illustrated in varying illustration perspectives.

FIG. 10 provides enhanced detail with respect to filtering element 250 where openings 251 in the element 250 are shown to allow rapid evacuation of water introduced to the filtering element 250 via conduit 272 and exiting orifice 271. As indicated, first filtering element 276 is a porous membrane or hard surface filtering composition to allow passage therethrough of water but serves to retain waste and other non-desired elements from returning to the tank's first section containing fish. FIGS. 10A through 10C disclose and illustrate the elements, components and structural relationship of said filtering compartment defined in FIG. 10 and further specificity as illustrated in varying illustration perspectives.

As indicated, the enhanced filtration and water conditioning system for bait tanks as presented in one or more embodiments of the instant invention may be combined with a water conditioning unit to maintain a desired/consistent water temperature. Complete disclosure and claims with respect to said water conditioning capability is presented, claimed in parent application (10/293,117).

As defined herein the system of the instant invention is illustrated in association with the afore-noted figures is comprised of a bait tank 100 having a top 108 and a bottom 105 and an essentially oval-shaped exterior wall 103 connecting the top 108 and exterior bottom of the tank. An essentially oval-shaped interior wall 203 is distanced sufficiently from the oval-shaped exterior wall 103 to allow displacement therebetween of an insulating material 125 with said interior wall also connecting the top 108 to an interior bottom of the tank 204. Said interior bottom 204 is distinguishable and separate in structure and intent from interior bottom of tank 105. The insulating material placed between interior tank bottom 204 and tank bottom 105 may be the same insulating material as may be placed between the tank's essentially oval-shaped interior wall 203 and essential oval-shaped external wall 103 with such insulating material being either be a gaseous compound, fiberglass, expandable foam compound or any other insulating means well known and skilled by those practiced in the art. Tank 100 of the instant invention has distinguishably separate first 109 and second interior water compartments which are communicably connected by at least two water traversable conduits 210, 230 for inflow and outflow filtration/circulation. With said traversable conduit 210 introducing non-filtered water to a filtering compartment 276 located within the second tank's interior water compartment 111. The filtering unit is further comprised of filtration unit inflow 230 and outflow conduits 210 with each of conduits communicably attaching filtration unit 270 to first 109 and/or second interior water compartments. A pumping means 211 is available and shown for circulating water from the first compartment 109 into and through the second compartment 111 and returning the circulated water 311 to the first compartment at a level below the surface of water 315 contained within the first compartment. Though not as efficient in practice, it is easily envisioned with the alternative embodiment of the present invention would call for a single water compartment and not two water compartments indistinguishable for one another.

The instant invention is readily combined with the water conditioning unit of pending and co-pending of application Ser. No. 10/293,117 wherein the bait tank of the instant invention further comprises attaching said water conditioning unit via input and output water conduits. The water conditioning compartments then having in combination a tubular conductor in communication with an evaporator, compressor and condenser to form a heat exchanger and a refrigerant traversing the tubular conductor as well as a means for circulating water from the first water compartment through the water conditioning unit and cooling the water thereby via the water's traversing of a water flow conduit extended generally within the interior portion of said tubular connector positioned between .005 inch and .015 inch internally distant from the conductor.

It will of course be understood that various changes may be made in form, details, arrangement and proportions of the apparatus without departing from the scope of the invention, which generally stated consists of an apparatus capable of carrying out the objects above set forth, in the parts and combination of parts as disclosed and defined in the appended claims.

What is claimed is:

1. An enhanced filtration and water conditioning system for a bait tank comprising:

(a) a bait tank having a top, a bottom and an essentially oval shaped exterior wall connecting the top and bottom of the tank, first and second interior compartment lid covers pivotally attached to the top of said bait tank and each selectively covering a cutaway portion of the top of said tank, first and second interior water compartments separated from one another and the exterior wall, top and bottom portions of the tank via a first interior wall and a first interior bottom, a second interior wall separating the first and second interior water compartments, a dual compartment filtration unit removably accommodated within the interior portion of the second interior water compartment, filtration unit inflow and outflow water conduits each of said conduits communicably attaching said filtration unit to said first and said second interior water compartments, (b) pump means for circulating water from said first interior water compartment into and through said second interior water compartment and returning said circulating water to said first interior water compartment, (c) a water conditioning unit attached to the bait tank via input and output water conditioning conduits, including a water conditioning compartment having a tubular conductor in communication with an evaporator, compressor and condenser forming a heat exchanger, a refrigerant traversing said tubular conductor;

means for circulating water from said second interior water compartment through said water conditioning compartment and cooled thereby, then returning said circulating water to the first interior water compartment.

2. The system of claim 1 wherein the bait tank further comprises one or more tubular rod holders affixed to tank's exterior wall.

3. The system of claim 1 further comprising a control means for presetting upper and lower reference temperatures for said water in said bait tank.

* * * * *